United States Patent
Jung et al.

(10) Patent No.: US 11,212,444 B1
(45) Date of Patent: Dec. 28, 2021

(54) IMAGE PROCESSING DEVICE (71) Applicant: HANWHA TECHWIN CO., LTD., Seongnam-si (KR)

(72) Inventors: Gab Cheon Jung, Seongnam-si (KR); Eun Cheol Choi, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 17/159,809

(22) Filed: Jan. 27, 2021

(30) Foreign Application Priority Data

Jun. 15, 2020 (KR) .......... 10-2020-0072606

(51) Int. Cl.
*H04N 5/232* (2006.01)
*G06T 7/246* (2017.01)

(52) U.S. Cl.
CPC ......... *H04N 5/23254* (2013.01); *G06T 7/248* (2017.01); *H04N 5/23258* (2013.01); *H04N 5/23267* (2013.01); *H04N 5/23296* (2013.01)

(58) Field of Classification Search
CPC ........... H04N 5/23254; H04N 5/23296; H04N 5/23258; H04N 5/23267; H04N 19/527; H04N 19/521; H04N 19/56; H04N 5/23264; H04N 5/23251; G06T 7/248
See application file for complete search history.

(56) References Cited

U.S. PATENT DOCUMENTS

| | | | | |
|---|---|---|---|---|
| 10,623,643 B2 * | 4/2020 | Miyahara | ............ | H04N 5/23267 |
| 10,659,693 B2 * | 5/2020 | Jung | .................. | H04N 5/23254 |
| 2005/0163348 A1 * | 7/2005 | Chen | ........................ | G06T 7/215 |
| | | | | 382/107 |
| 2005/0179784 A1 * | 8/2005 | Qi | ...................... | H04N 5/23254 |
| | | | | 348/208.1 |
| 2008/0151064 A1 * | 6/2008 | Saito | .................. | H04N 5/23254 |
| | | | | 348/208.4 |
| 2008/0186386 A1 * | 8/2008 | Okada | ................ | H04N 5/23248 |
| | | | | 348/208.4 |
| 2009/0180704 A1 * | 7/2009 | Wey | .......................... | G06T 5/50 |
| | | | | 382/254 |
| 2011/0193978 A1 * | 8/2011 | Wu | .................... | H04N 5/23267 |
| | | | | 348/208.6 |
| 2012/0069203 A1 * | 3/2012 | Voss | .................... | H04N 5/23254 |
| | | | | 348/208.1 |

(Continued)

FOREIGN PATENT DOCUMENTS

| | | |
|---|---|---|
| CN | 103179399 A | 6/2013 |
| CN | 111598918 A | 8/2020 |

(Continued)

*Primary Examiner* — Chiawei Chen
(74) *Attorney, Agent, or Firm* — Sughrue Mion, PLLC (57) ABSTRACT

Provided is an image processing apparatus including at least one processor configured to implement a feature point extractor that detects a plurality of feature points in a first image input from an image sensor; a first motion vector extractor that extracts local motion vectors of the plurality of feature points and select effective local motion vectors from among the local motion vectors by applying different algorithms according to zoom magnifications of the image sensor; a second motion vector extractor that extracts a global motion vector by using the effective local motion vectors; and an image stabilizer configured to correct shaking of the first image based on the global motion vector.

20 Claims, 6 Drawing Sheets

(56) References Cited

U.S. PATENT DOCUMENTS

2015/0016683 A1\* 1/2015 Kinoshita .......... H04N 5/23254
    382/103
2019/0222761 A1\* 7/2019 Jung ....................... G06T 7/246

FOREIGN PATENT DOCUMENTS

| KR | 10-2016-0113887 A | 10/2016 |
|---|---|---|
| KR | 10-2017-0033126 A | 3/2017 |
| KR | 10-1861722 B1 | 5/2018 |
| KR | 10-2019-0087119 A | 7/2019 |
| KR | 10-2019-0095795 A | 8/2019 |

\* cited by examiner

IMAGE PROCESSING DEVICE

CROSS-REFERENCE TO THE RELATED APPLICATION

This application is based on and claims priority from Korean Patent Application No. 10-2020-0072606, filed on Jun. 15, 2020, in the Korean Intellectual Property Office, the disclosure of which is incorporated by reference herein in its entirety.

BACKGROUND

1. Field

One or more embodiments relate to an image processing device and an image processing method.

2. Description of Related Art

Recently, as the use of multimedia devices increases, the demand for image enhancement technology for digital images captured in various environments is also increasing. Image enhancement technology includes image blur removal, noise removal, image stabilization, etc., and is widely applied to digital cameras, smartphones, home cameras or camcorders, industrial surveillance cameras, broadcasting cameras, military image capturing devices, etc.

SUMMARY

One or more embodiments provide a method and apparatus for outputting a stabilized image from which shaking is removed even when an external shock is applied to an image capturing apparatus and there is a moving object in a captured image.

Various aspects of the inventive concept will be set forth in part in the description which follows and, in part, will be apparent from the description, or may be learned by practice of the presented embodiments of the disclosure.

According to one or more embodiments, an image processing apparatus includes at least one processor configured to implement: a feature point extractor configured to detect a plurality of feature points in a first image input from an image sensor; a first motion vector extractor configured to extract local motion vectors of the plurality of feature points and select effective local motion vectors from among the local motion vectors by applying different algorithms according to zoom magnifications of the image sensor; a second motion vector extractor configured to extract a global motion vector by using the effective local motion vectors; and an image stabilizer configured to correct shaking of the first image based on the global motion vector.

When the first image is an image captured at a high magnification having a magnification value greater than or equal to a predetermined value, the first motion vector extractor may select the effective local motion vectors from among the local motion vectors in the first image by using a motion area detected in a second image input from the image sensor prior to the first image.

When the first image is an image captured at the high magnification, the first motion vector extractor may set, in a foreground area of the first image, a first target area which is smaller than the foreground area of the first image corresponding to the motion area detected in the second image, and calculate an average value of magnitudes of local motion vectors existing in the first target area. The first motion vector extractor may set a second target area larger than the foreground area in the first image and select the effective local motion vectors from among local motion vectors existing in the second target area, wherein a difference between a magnitude of each of the effective local motion vectors in the second target area and the average value is equal to or greater than a threshold value.

A longitudinal length and a latitudinal length of the first target area may be smaller than a longitudinal length and a latitudinal length of the foreground area by up to twice the maximum magnitude of the local motion vectors in the first image.

A longitudinal length and a latitudinal length of the second target area may be greater than a longitudinal length and a latitudinal length of the foreground area by up to twice the maximum magnitude of the local motion vectors in the first image.

The average value of the magnitudes of the local motion vectors in the first image may include an average value of magnitudes of x direction components and an average value of magnitudes of y direction components.

When the first image is an image captured at a normal magnification, the first motion vector extractor may select the effective local motion vectors from among the local motion vectors of the first image using sensor data of a motion sensor.

When the first image is an image captured at a normal magnification having a magnification value lower than the predetermined value, the first motion vector extractor may generate a sensor vector based on the sensor data and select the effective local motion vectors from among the local motion vectors in the first image, wherein differences between a magnitude and a direction of the effective local motion vector and a magnitude and a direction of the sensor vector are equal to or less than threshold values.

The image processing apparatus may further include a motion area detector configured to detect a motion area from the first image in which shaking is corrected.

According to one or more embodiments, an image processing apparatus includes at least one processor configured to implement: a feature point extractor configured to detect a plurality of feature points from an image input from an image sensor; a motion vector extractor configured to extract local motion vectors of the plurality of feature points; a motion area detector configured to detect a motion area from an image input from the image sensor prior to the image; and an image stabilizer configured to correct shaking of the image by using the local motion vectors and the motion area, wherein the motion vector extractor sets, in a foreground area of a current image, a first target area which is smaller than the foreground area corresponding to a motion area detected in a previous image, and calculates an average value of magnitudes of local motion vectors existing in the first target area, and the motion vector extractor sets a second target area larger than the foreground area in the current image, removes a local motion vector having a magnitude which has a difference from the average value by less than a threshold value, from local motion vectors in the second target area, and selects a local motion vector having a magnitude which has a difference is equal to or greater than the threshold value.

The current image may be an image captured by the image sensor at a high magnification having a magnification value greater than or equal to a predetermined value.

According to one or more embodiments, a computer-readable recording medium storing a computer-readable code for an image shaking correction method is provided The image shaking correction method includes detecting a plurality of feature points in a first image input from an image sensor; extracting local motion vectors of the plurality of feature points and selecting effective local motion vectors from among the local motion vectors by applying different algorithms according to zoom magnifications of the image sensor; extracting a global motion vector by using the effective local motion vectors; and correcting shaking of the first image based on the global motion vector.

The selecting the effective local motion vectors may include, based on the first image being an image captured at a high magnification having a magnification value greater than or equal to a predetermined value, selecting effective local motion vectors from among local motion vectors in the first image by using a motion area detected in a second image input from the image sensor prior to the first image.

The selecting the effective local motion vectors may include, based on the first image being an image captured at a high magnification having a magnification value greater than or equal to a predetermined value, setting, in a foreground area of the first image, a first target area which is smaller than the foreground area corresponding to the motion area detected in the second image, and calculating an average value of magnitudes of local motion vectors in the first target area; and setting a second target area larger than the foreground area in the first image, and selecting the effective local motion vectors from local motion vectors in the second target area, wherein a difference between a magnitude of each of the effective local motion vectors in the second target area and the average value is equal to or greater than a threshold value.

A longitudinal length and a latitudinal length of the first target area may be smaller than a longitudinal length and a latitudinal length of the foreground area by up to twice the maximum magnitude of the local motion vectors in the first image.

A longitudinal length and a latitudinal length of the second target area may be greater than a longitudinal length and a latitudinal length of the foreground area by up to twice the maximum magnitude of the local motion vectors in the first image.

The average value of magnitudes of the local motion vectors in the first image may include an average value of magnitudes of x direction components and an average value of magnitudes of y direction components.

The selecting of the effective local motion vectors may further include, based on the first image being an image captured at a normal magnification having a magnification value lower than a predetermined value, selecting the effective local motion vectors from the local motion vectors in the first image using sensor data of a motion sensor.

In the selecting the effective local motion vectors, based on the first image being an image captured at a normal magnification having a magnification value lower than the predetermined value, a sensor vector is generated based on sensor data of a motion sensor, and the effective local motion vectors are selected from the local motion vectors in the first image, wherein differences between a magnitude and a direction of the effective local motion vector and a magnitude and a direction of the sensor vector are equal to or less than threshold values.

The method may further include detecting a motion area from the first image in which shaking is corrected.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The embodiment disclosed herein are all example embodiments. One of ordinary skill in the art can implement the principles of one or more embodiments and invent various devices included in the concept and scope of one or more embodiments, although not clearly described or illustrated herein. In addition, it should be understood that all conditional terms and examples listed in this specification are, in principle, expressly intended only for the purpose of making the concept of one or more embodiments understood, and are not limited to the embodiments and states specifically listed as such. Furthermore, it should be understood that all detailed description listing specific embodiments as well as principles, aspects, and examples of one or more embodiments are intended to include structural and functional equivalents of these matters. In addition, these equivalents should be understood to include not only currently known equivalents, but also equivalents to be developed in the future, that is, all devices invented to perform the same function regardless of structure.

Accordingly, the functions of various elements shown in the drawings including a processor or a functional block represented by a similar concept may be provided by use of not only dedicated hardware but also hardware having the ability to execute software in association with appropriate software. When provided by a processor, functions may be provided by a single dedicated processor, a single shared processor, or multiple individual processors, and some of which may be shared. In addition, the use of terms presented as a processor, a control, or similar concepts should not be interpreted exclusively by referring to hardware capable of executing software and should be implicitly understood as including, without limitation, digital signal processor (DSP) hardware and read-only memory (ROM), random-access memory (RAM), and non-volatile memory for storing software. Other commonly used hardware may also be included.

The operations or steps of the methods or algorithms described herebelow can be embodied as computer readable codes on a computer readable recording medium. The computer readable recording medium is any data storage device that can store data which can be thereafter read by a computer system. Examples of the computer readable recording medium include ROM, RAM, compact disc (CD)-ROM, digital versatile disc (DVD), magnetic tape, floppy disk, and optical data storage device, not being limited thereto. The computer readable recording medium can be distributed over network coupled computer systems so that the computer readable code is stored and executed in a distributed fashion.

The above objects, features, and advantages will become more apparent through the following detailed description in connection with the accompanying drawings. In the following description of one or more embodiments, the detailed description of known functions and configurations incorporated herein is omitted when it may make the subject matter of one or more embodiments rather unclear.

The terms used in the present specification are merely used to describe particular embodiments, and are not intended to limit one or more embodiments. An expression used in the singular encompasses the expression of the plural, unless it has a clearly different meaning in the context. In the present specification, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

While such terms as "first," "second," etc., may be used to describe various elements, such elements must not be limited to the above terms. The above terms may be used only to distinguish one element from another.

Hereinafter, one or more embodiments will be described in detail with reference to the accompanying drawings.

Figure 1:
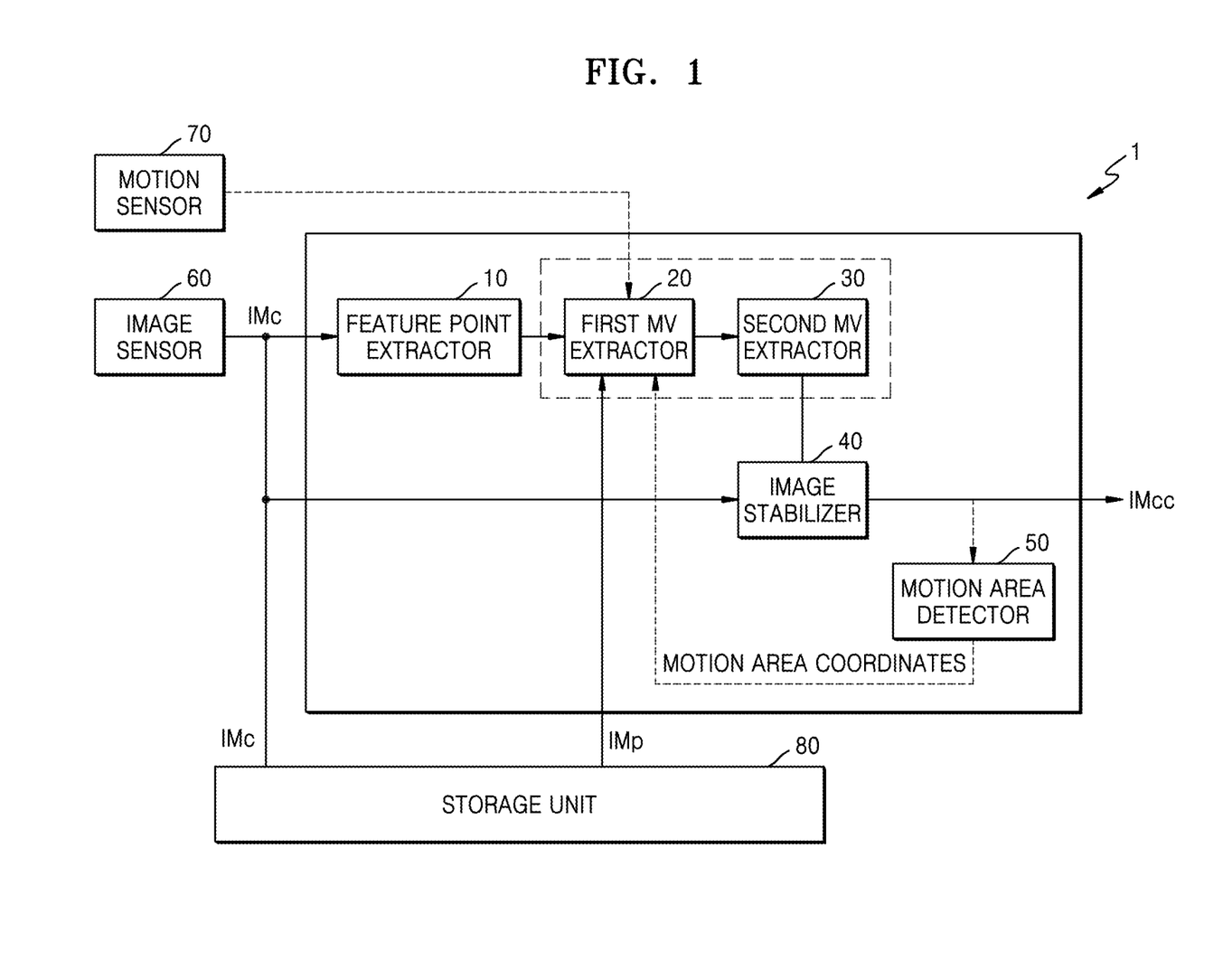
FIG. 1 is a schematic internal configuration diagram of an image processing apparatus, according to an embodiment.
Figure 2:
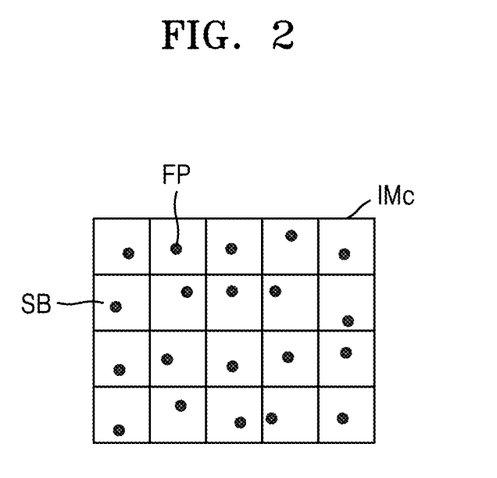
FIG. 2 is a diagram for describing feature point extraction of the image processing apparatus shown in FIG. 1, according to an embodiment.
Figure 3:
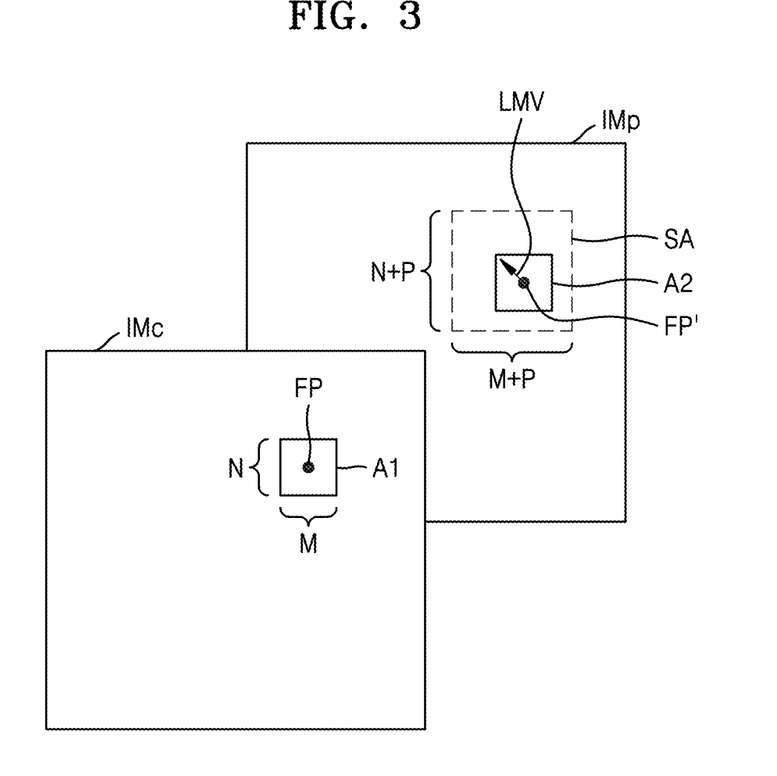
FIGS. 3 and 4 are diagrams for describing extraction of a local motion vector of the image processing apparatus shown in FIG. 1, according to an embodiment.
Figure 4:
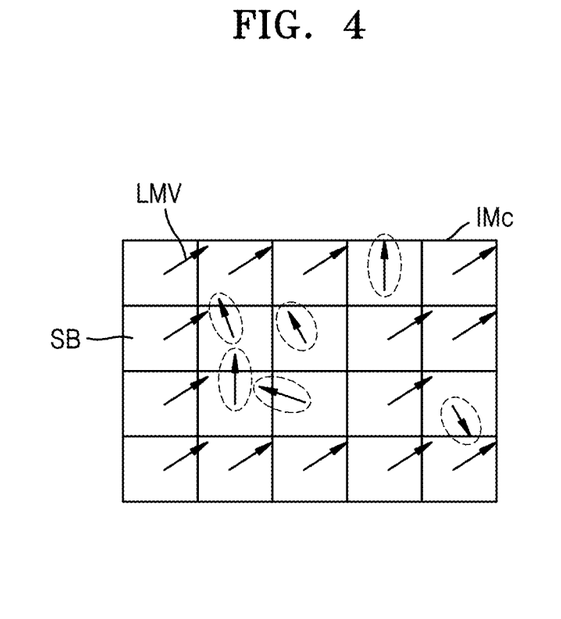
Figure 5:
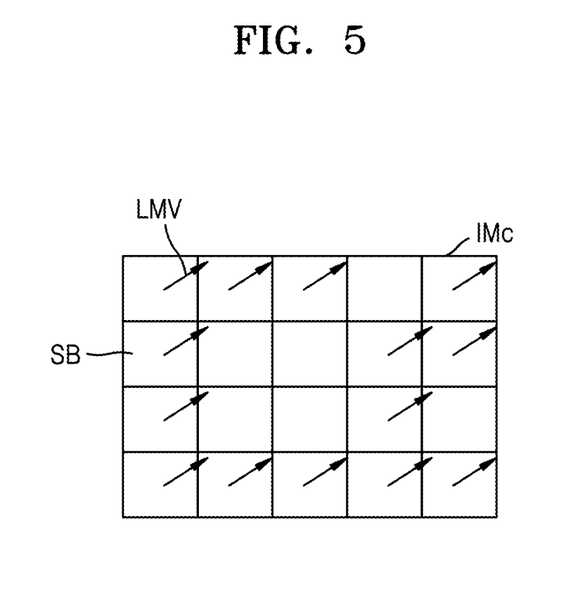
FIG. 5 is a diagram for describing removal of a local motion vector of the image processing apparatus shown in FIG. 1, according to an embodiment.
Figure 6:
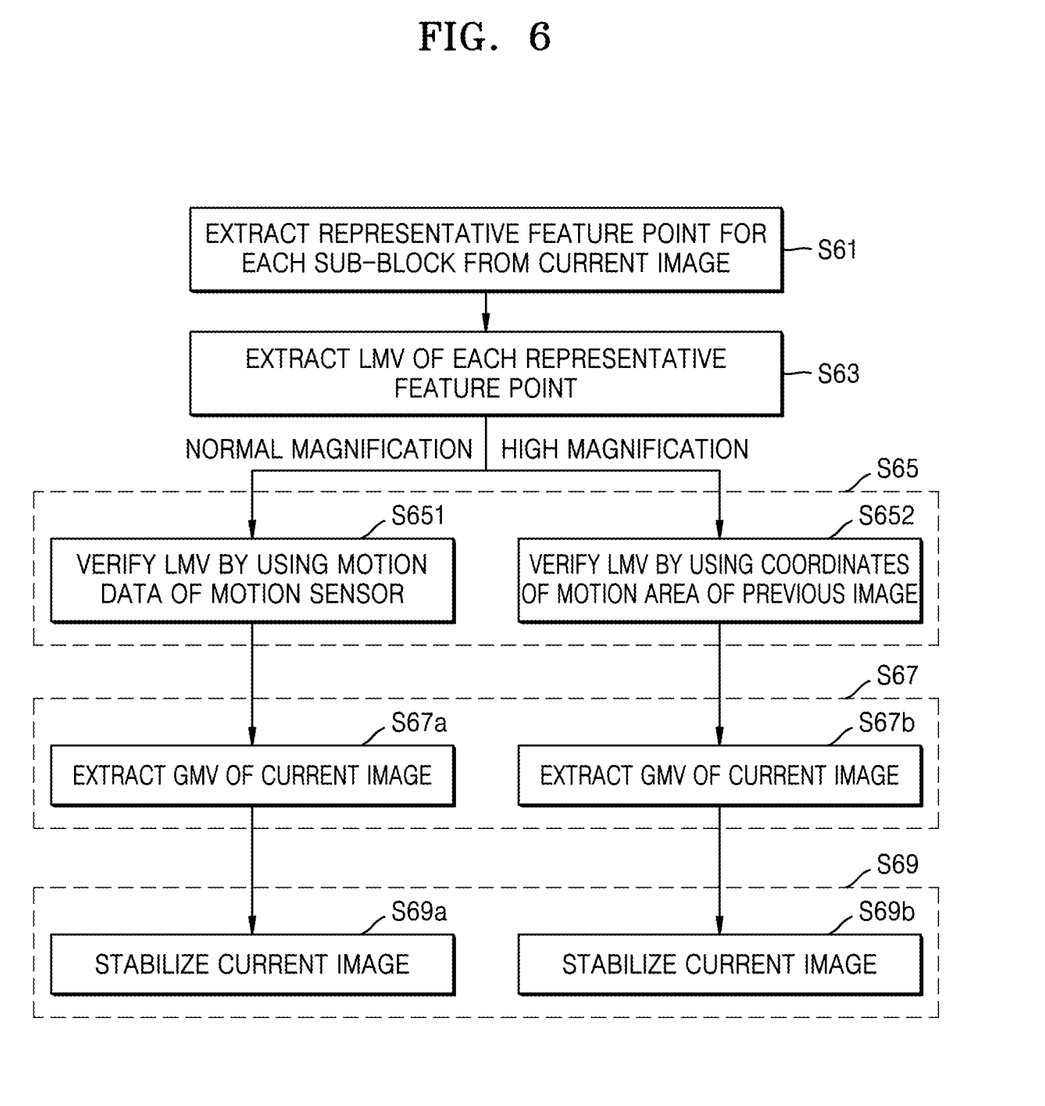
FIG. 6 is a schematic flowchart of an image processing method of the image processing apparatus shown in FIG. 1, according to an embodiment.

FIG. 1 is a schematic internal configuration diagram of an image processing apparatus, according to an embodiment. FIG. 2 is a diagram for describing feature point extraction performed by the image processing apparatus shown in FIG. 1, according to an embodiment. FIGS. 3 and 4 are diagrams for describing extraction of a local motion vector performed by the image processing apparatus shown in FIG. 1, according to an embodiment. FIG. 5 is a diagram for describing removal of a local motion vector performed by the image processing apparatus shown in FIG. 1, according to an embodiment. FIG. 6 is a schematic flowchart of an image processing method of the image processing apparatus shown in FIG. 1, according to an embodiment.

Referring to FIG. 1, the image processing apparatus 1 according to an embodiment may be connected to an image sensor 60, a motion sensor 70, and a storage unit 80 in a wired or wireless manner. Wireless communication may include short-range wireless communication like Zigbee, Bluetooth, radio frequency identification (RFID), NFC, and infrared communication and mobile communication or wireless internet communication like 3G, 4G (LTE), 5G, WiFi, Wibro, Wimax, etc.

The image sensor 60 may be an image capturing device that converts an optical signal into an electrical signal by using a photoelectric conversion device like a charge-coupled device (CCD) or a complementary metal-oxide-semiconductor (CMOS) to generate a series of images.

The motion sensor 70 may generate motion data corresponding to physical shaking of the image sensor 60. The motion sensor 70 may include a gyro sensor or an acceleration sensor. The motion sensor 70 may generate motion data by detecting an amount of physical movement, such as rotation, of the image sensor 60. When the motion sensor 70 is a gyro sensor, the motion data may include an angular velocity of the image sensor 60.

The storage unit 80 may store a program for processing and controlling the image processing apparatus 1 or may store input or output data (e.g., an image). The storage unit 80 may include an internal memory and/or an external storage medium like an SD card. The storage unit 80 may include a web storage, a cloud server, etc. that perform a storage function through the Internet.

When the image sensor 60 is shaken due to a user's hand shaking, wind, external shock, etc., rotation and/or translation may occur. Distortion may occur in a captured image due to shaking of the image sensor 60. The image processing apparatus 1 may output a stabilized image by correcting image distortion caused by shaking of the image sensor 60. When the image sensor 60 is provided in the image processing apparatus 1, the motion sensor 70 may detect shaking of the image processing apparatus 1, and the image processing apparatus 1 may correct image distortion caused by the shaking of the image processing apparatus 1 and output a stabilized image.

The image processing apparatus 1 according to an embodiment includes a feature point extractor 10, a first motion vector extractor 20, a second motion vector extractor 30, an image stabilizer 40, and a motion area detector 50. FIG. 1 shows that the first motion vector extractor 20 and the second motion vector extractor 30 are separate elements. However, in another embodiment, the first motion vector extractor 20 and the second motion vector extractor 30 may be integrated into one element like one motion vector extractor. Hereinafter, descriptions thereof will be given with reference to FIG. 6 as well.

The feature point extractor 10 may extract feature points from a current image IMc (first image) input from the image sensor 60 (operation S61). As shown in FIG. 2, the feature point extractor 10 may divide the current image IMc into a plurality of sub-blocks SB. The feature point extractor 10 may extract a representative feature point FP from each sub-block SB. A method of extracting feature points is not particularly limited. For example, the feature point extractor 10 may use a Harris corner detection method, a scale invariant feature transform (SIFT) algorithm, a speeded up robust feature (SURF) algorithm, etc. to extract corners, edges, contours, and line intersections from the current image IMc as feature points. The feature point extractor 10 may detect a feature point having the highest feature value from at least one feature point extracted from each sub-block SB as a representative feature point FP.

The first motion vector extractor 20 may extract a local motion vector LMV for the representative feature point FP of each sub-block SB (operation S63). The first motion vector extractor 20 may extract the local motion vector LMV for the representative feature point FP by comparing the current image IMc with a previous image IMp (second image). As shown in FIG. 3, a first area A1 having the size of M×N may be set around the representative feature point FP in the current image IMc, and a search area SA corresponding to the first area A1 may be set in the previous image IMP. The search area SA may have a larger size than the first area A1. For example, the search area SA may have the size of (M+P)×(N+P). Here, M, N, and P may each represent the number of pixels. A previous image is an image input from the image sensor 60 prior to a current image and may be an image input immediately before the current image.

The first motion vector extractor 20 may determine an area in the search area SA of the previous image IMp most similar to the first area A1 as a second area A2. The first motion vector extractor 20 may obtain a vector between a corresponding feature point FP' of the second area A2 and the representative feature point FP of the first area A1 as the local motion vector LMV of the representative feature point FP. FIG. 4 shows the local motion vector LMV for the representative feature point FP of each sub-block SB.

According to one or more embodiments, the amount of computation may be reduced by extracting motion vectors for feature points using a block matching method.

The first motion vector extractor 20 may verify local motion vectors LMVs extracted from the current image IMc (operation S65). The first motion vector extractor 20 may select effective local motion vectors from among the local motion vectors LMVs extracted from the current image IMc, thereby verifying the local motion vectors LMVs. The first motion vector extractor 20 may apply a local motion vector verification algorithm differently according to zoom magnification of the image sensor 60. To this end, the image processing apparatus 1 may determine the zoom magnification of the image sensor 60.

The first motion vector extractor 20 may verify the local motion vectors LMVs by using motion data output from the motion sensor 70 when the image sensor 60 captures an image at a normal magnification (operation S651). In other words, the first motion vector extractor 20 may verify the local motion vectors LMVs by using both an image output by the image sensor 60 and motion data output from the motion sensor 70 when the image sensor 60 operates at a normal magnification.

The first motion vector extractor 20 may verify the local motion vectors LMVs by using motion area data output from the motion area detector 50 when the image sensor 60 captures an image at a high magnification (operation S652). In other words, the first motion vector extractor 20 may verify the local motion vectors LMVs by using an image output by the image sensor 60 and motion area data output from the motion area detector 50. The motion area data may be motion area data of a previous image. The previous image may be an image corrected by the image stabilizer 40. The criteria for classifying normal magnification and high magnification may vary according to user settings. For example, zoom magnifications of 40 times or higher may be set as high magnifications, and zoom magnifications lower than 40 times may be set as normal magnifications. Here, the normal magnification and the high magnifications may be optical zoom magnifications.

As shown in FIG. 5, the first motion vector extractor 20 may remove local motion vectors LMVs corresponding to a motion of an object included in the current image IMc, not a motion of the image sensor 60, by verifying the local motion vectors LMV, thereby detecting effective local motion vectors LMVs in the current image IMc. The verification of the local motion vectors LMVs will be described later.

The second motion vector extractor 30 may extract a global motion vector GMV based on the effective local motion vectors LMV detected from the current image IMc (operation S67). The second motion vector extractor 30 may extract the global motion vector GMV based on the effective local motion vectors LMV detected from the current image IMc obtained at a normal magnification (operation S67a). The second motion vector extractor 30 may extract the global motion vector GMV based on the effective local motion vectors LMV detected from the current image IMc obtained at a high magnification (operation S67b). The global motion vector GMV may represent a motion of the current image, and may be a vector representing the effective local motion vectors LMV.

The second motion vector extractor 30 may calculate a histogram of the effective local motion vectors LMVs, and extract the global motion vector GMV according to the calculated histogram. One or more embodiments are not limited thereto, and the global motion vector GMV may be extracted by various methods. For example, an average value or a median value of the effective local motion vectors LMVs may be extracted as the global motion vector GMV.

The image stabilizer 40 may output a corrected current image IMcc by correcting the shaking of the current image IMc by compensating the motion of the current image IMc by using the global motion vector GMV (operation S69). In this way, the shaking of the current image IMc is corrected. The image stabilizer 40 may output a corrected current image IMcc using the global motion vector GMV extracted from the current image IMc obtained at a normal magnification (operation S69a). The image stabilizer 40 may output the corrected current image IMcc using the global motion vector GMV extracted from the current image IMc obtained at a high magnification (operation S69b).

The motion area detector 50 may receive the corrected current image IMcc and detect a motion area from the corrected current image IMcc. The motion area detector 50 may detect a motion area from the corrected current image IMcc by using a Gaussian mixture model (GMM). The GMM model is highly effective against minute shaking of the background (dynamic background). However, one or more embodiments are not limited thereto, and a motion area may be detected by various methods like detecting a motion area from a difference image between a reference image and the corrected current image IMcc. The motion area detector 50 may output the coordinates of the motion area detected in the corrected current image IMcc to the first motion vector extractor 20, such that the coordinates are used to detect effective local motion vectors LMVs of a next image. The coordinates of the motion area may include the coordinates of the foreground.

The first motion vector extractor 20 may verify the local motion vectors LMVs of a next image by using the coordinates of the motion area of the corrected current image IMcc received from the motion area detector 50. In other words, the first motion vector extractor 20 may verify the local motion vectors LMV of a current image by using the coordinates of the motion area of a previous image.

Figure 7:
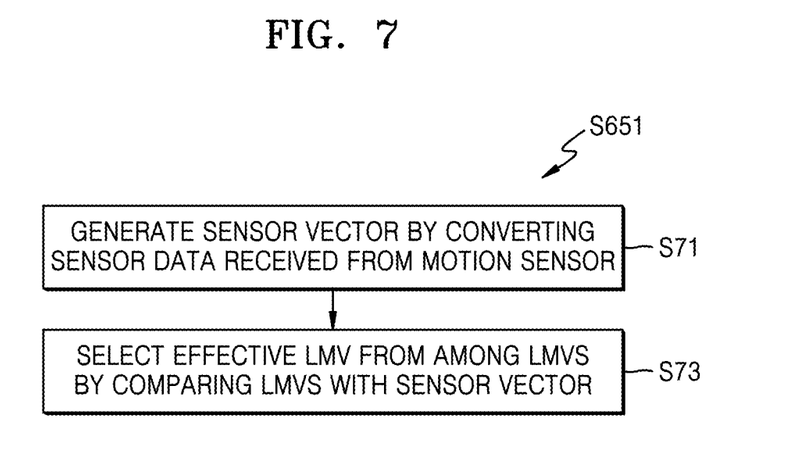
FIG. 7 is a schematic flowchart for describing operation 651 of FIG. 6, according to an embodiment.

First, verification of the local motion vectors LMVs in a case where the image sensor 60 captures an image at a normal magnification will be described. FIG. 7 is a schematic flowchart for describing operation 651 of FIG. 6, according to an embodiment. Detailed descriptions thereof will be given below with reference to FIGS. 1 and 7.

The first motion vector extractor 20 may receive sensor data from the motion sensor 70 and generate a sensor vector by converting the sensor data (operation S71). The sensor data may be a physical movement amount of the image sensor 60 detected by the motion sensor 70, e.g., an angular velocity measured by a gyro sensor. The first motion vector extractor 20 may generate a sensor vector by converting the sensor data into pixel displacement values.

The first motion vector extractor 20 may select effective local motion vectors LMVs by comparing local motion vectors LMVs extracted from the current image IMc with the sensor vector (operation S73). The first motion vector extractor 20 may determine that a local motion vector LMV is effective when differences between a direction and a magnitude of the sensor vector and a direction and a magnitude of the local motion vector LMV are less than or equal to threshold values. When the differences between the direction and the magnitude of a sensor vector and the direction and the magnitude of a local motion vector LMV are out of (e.g., exceeds) the threshold values, the first motion vector extractor 20 may determine that the local motion vector LMV indicates a motion due to a movement of an object included in the current image IMc, and may remove the local motion vector LMV.

Figure 8:
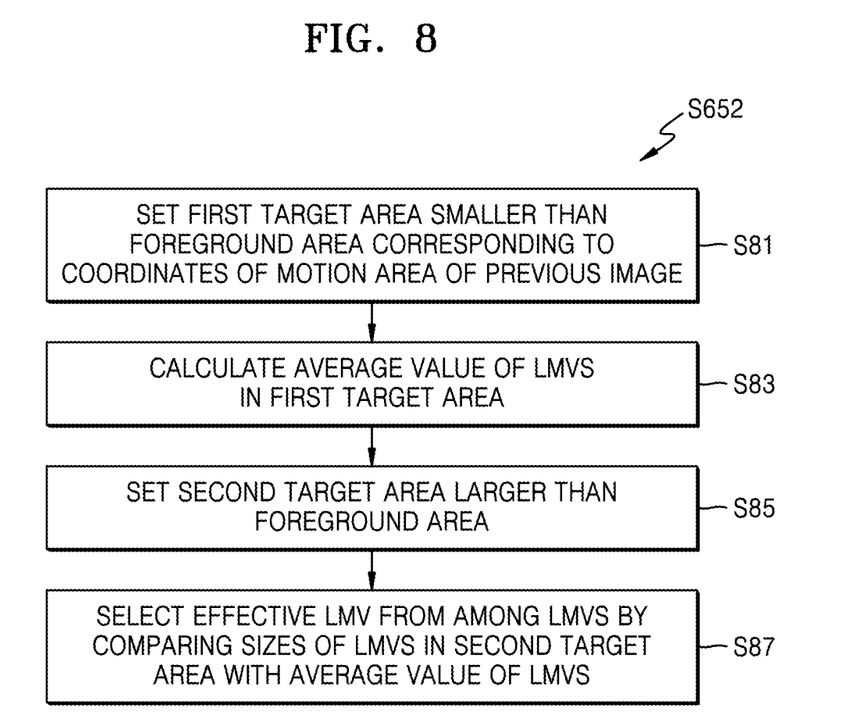
FIG. 8 is a schematic flowchart for describing operation 652 of FIG. 6, according to an embodiment.
Figure 9:
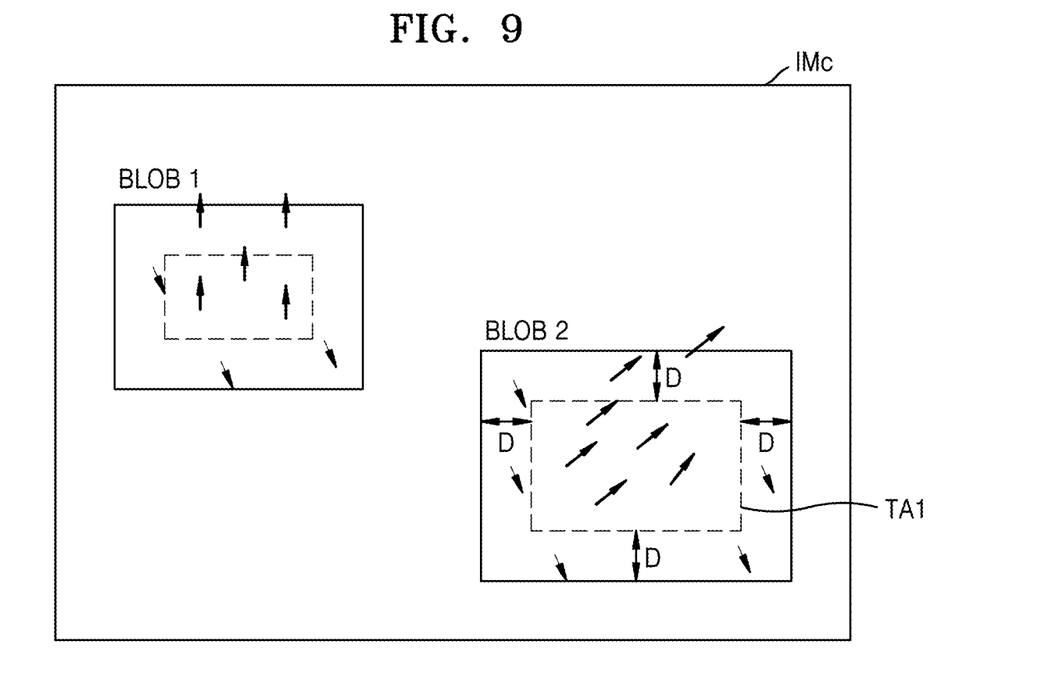
FIGS. 9 and 10 are diagrams for describing operation 652, according to an embodiment.
Figure 10:
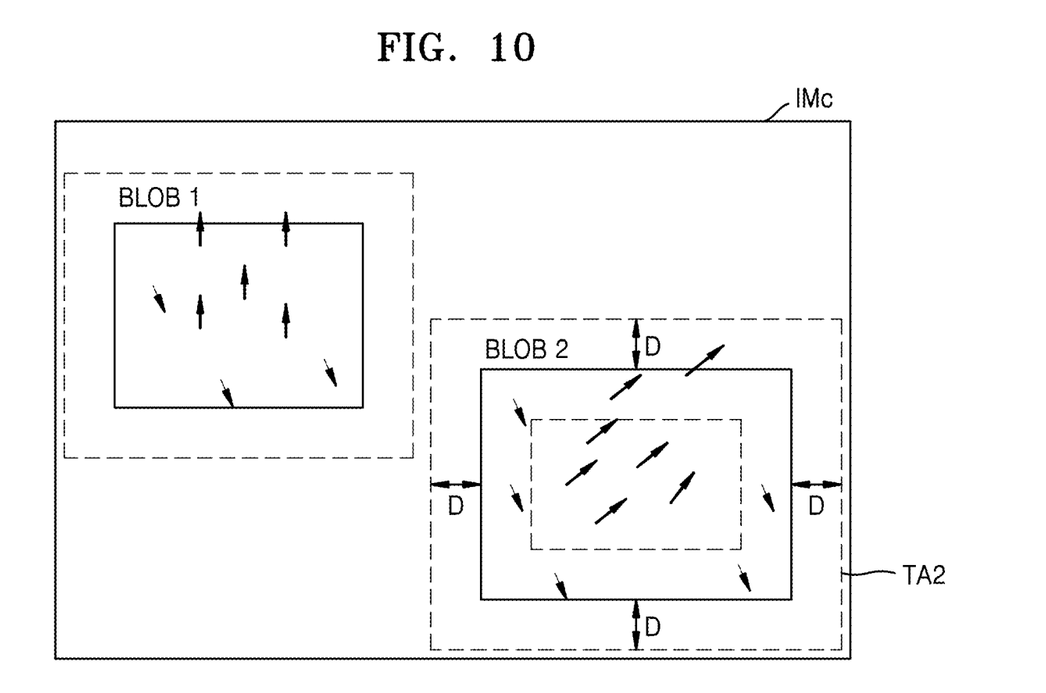

Next, verification of the local motion vector MV in a case where the image sensor 60 captures an image at a high magnification will be described. FIG. 8 is a schematic flowchart for describing operation 652 of FIG. 6, according to an embodiment. FIGS. 9 and 10 are diagrams for describing operation 652. Detailed descriptions thereof will be given below with reference to FIGS. 1 and 8, according to an embodiment.

When there is a moving object in an image, the first motion vector extractor 20 may receive the coordinates of at least one motion area of a previous image from the motion area detector 50, search for a foreground area BLOB corresponding to the motion area in a current image IMc by using received coordinates of the motion area, and set a first target area TA1 smaller than the foreground area BLOB in the foreground area BLOB (operation S81). FIG. 9 shows an example in which a first target area TA1 is set in each of two foreground areas BLOB1 and BLOB2. The longitudinal length and the latitudinal length of the first target area TA1 may each be 2D smaller than the longitudinal length and the latitudinal length of the foreground area BLOB, for example, each of the BLOB1 and BLOB2. Here, D may denote a maximum value from among magnitudes of local motion vectors LMVs of the current image IMc. The size of the first target area TA1 may vary according to the size of the foreground area BLOB.

The first motion vector extractor 20 may calculate an average value of local motion vectors LMV existing in the first target area TA1 (operation S83). The first motion vector extractor 20 may calculate an average value of the magnitudes of x-direction components of the local motion vectors LMV and an average value of the magnitudes of y-direction components of the local motion vectors LMV.

Equation (1) is an equation for calculating an average value μ of magnitudes Vecx of the x-direction components of the local motion vectors LMVs existing in the first target area TA1 of an i-th foreground area BLOB. Equation (2) is an equation for calculating an average value μ of magnitudes Vecy of the y-direction components of the local motion vectors LMVs existing in the first target area TA1 of an i-th foreground area BLOB. M denotes the number of local motion vectors LMVs existing in the first target area TA1.

$$\mu(i, x) = 1/M \sum_{k=0}^{M-1} (|Vecx_k|) \quad (1)$$

$$\mu(i, y) = 1/M \sum_{k=0}^{M-1} (|Vecy_k|) \quad (2)$$

The first motion vector extractor 20 may set a second target area TA2 larger than the foreground area BLOB in the current image IMc (operation S85). FIG. 10 shows an example in which a second target area TA2 is set in each of the two foreground areas BLOB1 and BLOB2. The longitudinal length and the latitudinal length of the second target area TA2 may each be 2D greater than the longitudinal length and the latitudinal length of the foreground area BLOB, for example, each of the BLOB1 and BLOB2. The size of the second target area TA2 may vary according to the size of the foreground area BLOB.

The first motion vector extractor 20 may compare the magnitudes of the local motion vectors LMVs existing in the second target area TA2 with the average value of the local motion vectors LMVs calculated in operation 83, and select effective local motion vectors LMV (operation S87). The first motion vector extractor 20 may determine that a local motion vector LMV is effective when a difference between the average value of the local motion vectors LMV and the magnitude of the local motion vector LMV is equal to or greater than a threshold value. The first motion vector extractor 20 may determine that a local motion vector LMV indicates a motion due to a movement of an object when a difference between the average value of the local motion vectors LMV and the magnitude of the local motion vector LMV is less than the threshold value, and may remove the local motion vector LMV.

Referring to Equation (3), when differences between the magnitudes I of the x-direction component and the y-direction component of a local motion vector LMV in the second target area TA2 of the i-th foreground area BLOB and the average value μ calculated in operation S83 is less than a threshold value L, the first motion vector extractor 20 may determine the local motion vector LMV as a motion vector M of an object. Otherwise, the first motion vector extractor 20 may determine the local motion vector LMV as an effective local motion vector LMV.

$$M(x, y) = \begin{cases} 1, & |I(i, x) - \mu(i, x)| < L \text{ and } |I(i, y) - \mu(i, y)| < L \\ 1, & \text{otherwise} \end{cases} \quad (3)$$

The image processing apparatus 1 may be configured to capture, generate, process, transform, scale, encode, decode, transmit, store, and display digital images and/or video sequences. The image processing apparatus 1 may be implemented as a device including a wireless communication device, a personal digital assistant (PDA), a laptop computer, a desktop computer, a camcorder, a digital camera, a CCTV, an action camera, a digital recording device, a network-enabled digital television, a mobile phone, a cellular phone, a satellite phone, a camera phone, a two-way communication device, etc.

In the above-described embodiment, the image sensor 60, the motion sensor 70, and the storage unit 80 are shown as components separate from the image processing apparatus 1. However, in another embodiment, at least one of the image sensor 60, the motion sensor 70, and the storage unit 80 may be provided in the image processing apparatus 1 as a part of the image processing apparatus 1.

With the development of optical technology, CCTV surveillance cameras are supporting high zoom magnification. At high magnification, a large motion may occur in an actual image even with a minute shaking that may not be effectively detected by a motion sensor. It may be difficult to apply image stabilization using a motion sensor like a gyro sensor to a minute shaking situation, and image-based image stabilization may cause a malfunction of determining a movement of a large moving object or movements of multiple objects in the same direction as global movements of an image.

According to one or more embodiments, more accurate effective local motion vector LMV may be extracted by using sensor data from a motion sensor at normal magnification, and effective local motion vectors may only be extracted based on images when an amount of sensor data from the motion sensor is very small at high magnification. In another embodiment, even in the case of a high magnification, when a sufficient amount of sensor data (more than a certain amount) from the motion sensor is secured, an effective local motion vector LMV may be extracted by using the sensor data of the motion sensor as in the case of a normal magnification.

According to one or more embodiments, a motion area may be detected by using a GMM or the like for images stabilized through correction in response to a dynamic object (moving object) at a high magnification. Also, by excluding local motion vectors LMVs indicating patterns similar to the local motion vector LMVs in a motion area of a previous image and areas adjacent thereto, from local motion vectors LMVs of a current image, motion vectors corresponding to dynamic objects may be excluded, and thus more stable global motion vectors may be extracted.

An image processing apparatus and an image processing method according to one or more embodiments may provide stable image signals in various video surveillance systems in various intelligent facilities ranging from airports, military facilities, ports, roads, bridges, and other major national facilities, subways, buses, building rooftops, stadiums, parking lots, automobiles and mobile devices, and robots.

An image processing apparatus according to one or more embodiments may provide a stable image from which the shaking is removed in response to the shaking of the image, even when there is an object moving.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An image processing apparatus comprising at least one processor configured to implement: a feature point extractor configured to detect a plurality of feature points in a first image input from an image sensor;

a first motion vector extractor configured to extract local motion vectors of the plurality of feature points and select effective local motion vectors from among the local motion vectors in the first image by applying different algorithms according to different zoom magnifications of the image sensor;

a second motion vector extractor configured to extract a global motion vector by using the effective local motion vectors; and an image stabilizer configured to correct shaking of the first image based on the global motion vector.

2. The image processing apparatus of claim 1, wherein, based on the first image being an image captured at a high magnification having a magnification value greater than or equal to a predetermined value, the first motion vector extractor is configured to select the effective local motion vectors from among the local motion vectors in the first image by using a motion area detected in a second image input from the image sensor prior to the first image.

3. The image processing apparatus of claim 2, wherein, based on the first image being an image captured at the high magnification, the first motion vector extractor is configured to set, in a foreground area of the first image, a first target area which is smaller than the foreground area corresponding to the motion area detected in the second image, and calculate an average value of magnitudes of local motion vectors in the first target area, and the first motion vector extractor is configured to set a second target area larger than the foreground area in the first image, and select the effective local motion vectors from local motion vectors in the second target area, wherein a difference between a magnitude of each of the effective local motion vectors in the second target area and the average value is equal to or greater than a threshold value.

4. The image processing apparatus of claim 3, wherein a longitudinal length and a latitudinal length of the first target area are smaller than a longitudinal length and a latitudinal length of the foreground area by up to twice the maximum magnitude of the local motion vectors in the first image.

5. The image processing apparatus of claim 3, wherein a longitudinal length and a latitudinal length of the second target area are greater than a longitudinal length and a latitudinal length of the foreground area by up to twice the maximum magnitude of the local motion vectors in the first image.

6. The image processing apparatus of claim 3, wherein the average value of the magnitudes of the local motion vectors in the first image comprises an average value of magnitudes of x direction components and an average value of magnitudes of y direction components.

7. The image processing apparatus of claim 2, wherein, based on the first image being an image captured at a normal magnification having a magnification value lower than the predetermined value, the first motion vector extractor is configured to select the effective local motion vectors from the local motion vectors in the first image using sensor data of a motion sensor.

8. The image processing apparatus of claim 3, wherein, based on the first image being an image captured at a normal magnification having a magnification value lower than the predetermined value, the first motion vector extractor is configured to generate a sensor vector based on sensor data of a motion sensor, and select the effective local motion vectors from among the local motion vectors in the first image, wherein differences between a magnitude and a direction of the effective local motion vector and a magnitude and a direction of the sensor vector are equal to or less than threshold values.

9. The image processing apparatus of claim 1, further comprising a motion area detector configured to detect a motion area from the first image in which shaking is corrected.

10. An image processing apparatus comprising at least one processor configured to implement:
a feature point extractor configured to detect a plurality of feature points from an image input from an image sensor;
a motion vector extractor configured to extract local motion vectors of the plurality of feature points;
a motion area detector configured to detect a motion area from an image input from the image sensor prior to the image; and
an image stabilizer configured to correct shaking of the image by using the local motion vectors and the motion area,
wherein
the motion vector extractor is configured to set, in a foreground area of a current image, a first target area which is smaller than the foreground area corresponding to a motion area detected in a previous image, and calculate an average value of magnitudes of local motion vectors in the first target area, and
the motion vector extractor is further configured to set a second target area larger than the foreground area in the current image, remove a local motion vector having a magnitude which has a difference from the average value by less than a threshold value, from local motion vectors in the second target area, and selects a local motion vector having a magnitude which has a difference is equal to or greater than the threshold value.

11. The image processing apparatus of claim 10, wherein the current image is an image captured by the image sensor at a high magnification having a magnification value greater than or equal to a predetermined value.

12. A non-transitory computer-readable recording medium storing a computer-readable code for an image shaking correction method, the image shaking correction method comprising:
detecting a plurality of feature points in a first image input from an image sensor;
extracting local motion vectors of the plurality of feature points and selecting effective local motion vectors from among the local motion vectors by applying different algorithms according to different zoom magnifications of the image sensor;
extracting a global motion vector by using the effective local motion vectors; and
correcting shaking of the first image based on the global motion vector.

13. The non-transitory computer-readable recording medium storing a computer-readable code for the image shaking correction method of claim 12, wherein the selecting the effective local motion vectors comprises, based on the first image being an image captured at a high magnification having a magnification value greater than or equal to a predetermined value, selecting effective local motion vectors from among local motion vectors in the first image by using a motion area detected in a second image input from the image sensor prior to the first image.

14. The non-transitory computer-readable recording medium storing a computer-readable code for the image shaking correction method of claim 13, wherein the selecting the effective local motion vectors comprises, based on the first image being an image captured at a high magnification having a magnification value greater than or equal to a predetermined value, setting, in a foreground area of the first image, a first target area which is smaller than the foreground area corresponding to the motion area detected in the second image, and calculating an average value of magnitudes of local motion vectors in the first target area; and
setting a second target area larger than the foreground area in the first image, and selecting the effective local motion vectors from local motion vectors in the second target area, wherein a difference between a magnitude of each of the effective local motion vectors in the second target area and the average value is equal to or greater than a threshold value.

15. The non-transitory computer-readable recording medium storing a computer-readable code for the image shaking correction method of claim 14, wherein a longitudinal length and a latitudinal length of the first target area are smaller than a longitudinal length and a latitudinal length of the foreground area by up to twice the maximum magnitude of the local motion vectors in the first image.

16. The non-transitory computer-readable recording medium storing a computer-readable code for the image shaking correction method of claim 14, wherein a longitudinal length and a latitudinal length of the second target area are greater than a longitudinal length and a latitudinal length of the foreground area by up to twice the maximum magnitude of the local motion vectors in the first image.

17. The non-transitory computer-readable recording medium storing a computer-readable code for the image shaking correction method of claim 14, wherein the average value of magnitudes of the local motion vectors in the first image comprises an average value of magnitudes of x direction components and an average value of magnitudes of y direction components.

18. The non-transitory computer-readable recording medium storing a computer-readable code for the image shaking correction method of claim 12, wherein the selecting the effective local motion vectors further comprises, based on the first image being an image captured at a normal magnification having a magnification value lower than a predetermined value, selecting the effective local motion vectors from the local motion vectors in the first image using sensor data of a motion sensor.

19. The non-transitory computer-readable recording medium storing a computer-readable code for the image shaking correction method of claim 18, wherein, in the selecting the effective local motion vectors, based on the first image being an image captured at a normal magnification having a magnification value lower than the predetermined value, a sensor vector is generated based on sensor data of a motion sensor, and the effective local motion vectors are selected from the local motion vectors in the first image, wherein differences between a magnitude and a direction of the effective local motion vector and a magnitude and a direction of the sensor vector are equal to or less than threshold values.

20. The non-transitory computer-readable recording medium storing a computer-readable code for the image shaking correction method of claim 12, further comprising detecting a motion area from the first image in which shaking is corrected.

* * * * *